United States Patent [19]
Kato et al.

[11] 3,809,041

[45] May 7, 1974

[54] IGNITION DEVICE FOR USE IN MULTIPLE CYLINDER INTERNAL COMBUSTION ENGINE

[75] Inventors: Mihoru Kato; Masao Nagasawa, both of Kariya, Japan

[73] Assignee: Nippondenso Co., Ltd., Kariya-shi, Japan

[22] Filed: June 20, 1972

[21] Appl. No.: 264,590

[30] Foreign Application Priority Data
June 24, 1971 Japan.................................. 46-46164

[52] U.S. Cl............................ 123/148 E, 123/149 R
[51] Int. Cl.............................................. F02p 3/06
[58] Field of Search........ 123/148 E, 149 D, 149 R; 315/209

[56] References Cited
UNITED STATES PATENTS

| | | | |
|---|---|---|---|
| 3,418,988 | 12/1968 | Lewis et al....................... | 123/148 E |
| 3,324,841 | 6/1967 | Kebbon et al................... | 123/149 R |
| 3,577,971 | 5/1971 | Cavil............................... | 123/149 D |
| 3,678,913 | 7/1972 | Zimmerman et al............. | 123/148 E |

Primary Examiner—Laurence M. Goodridge
Attorney, Agent, or Firm—Cushman, Darby & Cushman

[57] ABSTRACT

Current from a DC power source charges a group of capacitors. The charges stored in the capacitors are then released through the primary windings of ignition coils and controlled rectifiers which are turned conductive when the gates thereof receives gating signals in synchronism with the ignition timing of the engine, which gating signals are produced by magnetic means to detect the ignition timing in response to the rotation of the crankshaft of the engine. And spark voltage are induced in the secondary windings of the ignition coils in an appropriate timing to fire the spark plugs connected with the secondary windings of the ignition coils.

14 Claims, 18 Drawing Figures

IGNITION DEVICE FOR USE IN MULTIPLE CYLINDER INTERNAL COMBUSTION ENGINE

BACKGROUND OF THE INVENTION

1. Field of the Invention

The present invention relates to an ignition device, and more particularly to a condenser discharge ignition device for use especially in a three- or six-cylinder internal combustion engine.

2. Description of the Prior Art

The conventional ignition device of this type has condensers the number of which is equal to that of cylinder incorporated in the associated engine, which condensers are charged by a power source prepared specifically therefor, and each of which condensers is connected in parallel with a series circuit of a switching means and the primary winding of an ignition coil. In such a device, condensers to be used must have a large capacity and a high withstand voltage.

SUMMARY OF THE INVENTION

It is one object of the present invention to provide an ignition device which need not employ any large condenser but only uses a group of capacitors, each having a small capacitance and a low withstand voltage. Another object of the present invention is to provide an ignition device which exhibits a stable and secured ignition property even when a semiconductor switching element such as a thyristor or transistor is used as switching means.

DESCRIPTION OF THE PREFERRED EMBODIMENTS

Figure 1:
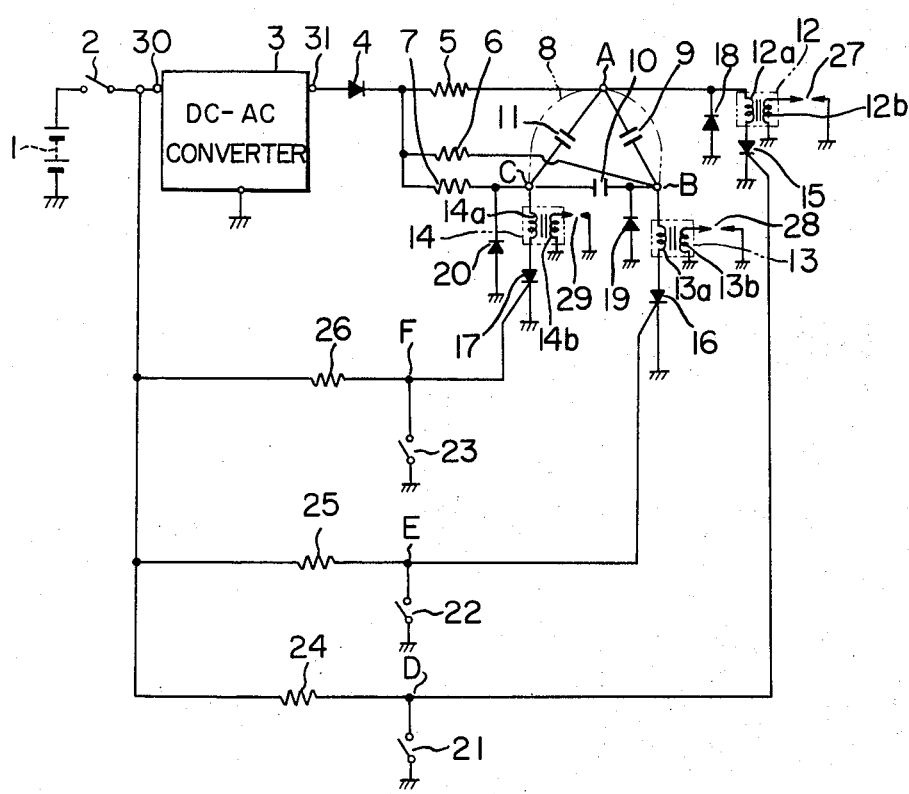
FIG. 1 is an electric circuit diagram of an ignition device as a first embodiment of the present invention.
Figure 2:
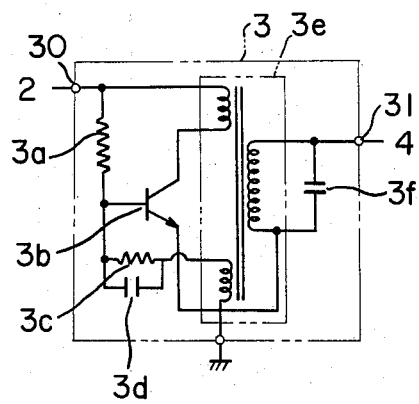
FIG. 2 shows in detail the circuit of the DC-AC converter shown in FIG. 1.

In FIG. 1 wherein the first embodiment of the present invention is shown, a battery 1 has its negative pole grounded and its positive pole connected through an ignition switch 2 with an inut terminal 30 of a DC-AC converter 3. The DC-AC converter 3 is of a blocking oscillator type, which serves to convert a low DC voltage to a high AC voltage and comprises, as seen in FIG. 2, a bias resistor 3a, a transistor 3b, a feedback resistor 3c, a feedback capacitor 3d, a transformer 3e and a capacitor for eliminating voltage spikes. The output terminal 31 of the DC-AC converter 3 is connected to the anode of a rectifying diode 4, of which the cathode is connected through resistors 5, 6 and 7 respectively with the terminals A, B and C of a group of capacitors 8. The group of capacitors 8 consists of capacitors 9, 10 and 11 connected in delta configuration, the three capacitors being connected with each other at the terminals A, B and C. The terminals A, B and C are connected through the primary windings 12a, 13 a and 14a of respective ignition coils 12, 13 and 14 with the anodes of controlled rectifiers (thyristors) 15, 16 and 17, respectively. The cathodes of these controlled rectifiers 15, 16 and 17 are grounded. The terminals A, B and C of the capacitor group 8 are further connected respectively with the cathodes of diodes 18, 19 and 20 the anodes of which are grounded to provide discharging paths of electric charges stored in the capacitors 9, 10 and 11. The control electrodes or gates of the controlled rectifiers 15, 16 and 17 are connected respectively with resistors 24, 25 and 26 at the points D, E and F, which resistors 24, 25 and and 26 are commonly connected with the input terminal 30 of the DC-AC converter 3. Interrupters 21, 22 and 23 are inserted between the point D and the earth, the point E and the earth, and the point F and the earth, respectively.

The interrupters 21, 22 and 23 sequentially alternate "ON" and "OFF", i.e., cyclically make and break circuits, in synchronism with the engine, and when each of the interrupter turns off an ignition signal is applied to the gate of the corresponding controlled rectifier.

Ignition or spark plugs 27, 28 and 29 provided in the cylinders of the engine are coupled to the secondary windings 12b, 13b and 14b of the corresponding ignition coils 12, 13 and 14.

Next, the operation of the ignition device having such a constitution as described above will be explained. The ignition switch 2 is closed when the engine is started. If the ignition switch 2 is closed, then the waveforms as shown in FIGS. 3(d), 3(e), and 3(f) appear at the points D, E and F by means of the interrupters 21, 22 and 23, respectively. In FIGS. 3(a) through 3(e), the abscissa designates time base t while the ordinate represents voltage V. In FIG. 3(a), an interval designated by T is one period. Now, at time $t_1$, the interrupter 21 is closed while the remaining interrupters 22 and 23 is open so that the controlled rectifier 15 is cut off while the other controlled rectifiers 16 and 17 remains conductive.

In this condition, charging currents flow into the capacitors 9 and 11 through two paths, i.e., the converter 3 - diode 4 - resistor 5 - terminal A - capacitor 9 - terminal B - primary winding 13a of ignition coil 13 - controlled rectifier 16 - the earth, and the converter 3 - diode 4 - resistor 5 - terminal A - capacitor 11 - terminal C - primary winding 14a of ignition coil 14 - controlled rectifier 17 - the earth. The charging process of the capacitors 9 and 11 is as shown in FIG. 3(a), the capacitors 9 and 11 being charged stepwise by half-wave rectified currents derived from several cycles of the AC outputs of the DC–AC converter 3 and continuing to be charged until the ignition signal has ceased, that is, the interrupter has been opened or until the terminal voltages across the capacitors have reached the AC no-load voltage.

Then, at time $t_2$ as soon as the interrupter 21 is opened, an ignition signal voltage is applied to the gate of the controlled rectifier 15. As a result, the rectifier 15 turns conductive so that the charges stored in the capacitors 9 and 10 are released through paths: terminal A - primary winding 12a of ignition coil 12 - controlled rectifier 15 - the earth - diodes 19, 20 - terminals B, C.

The charging current accordingly induces a high voltage in the secondary winding 12b of the ignition coil 12 so that the ignition plug 27 sparks.

Figure 3:
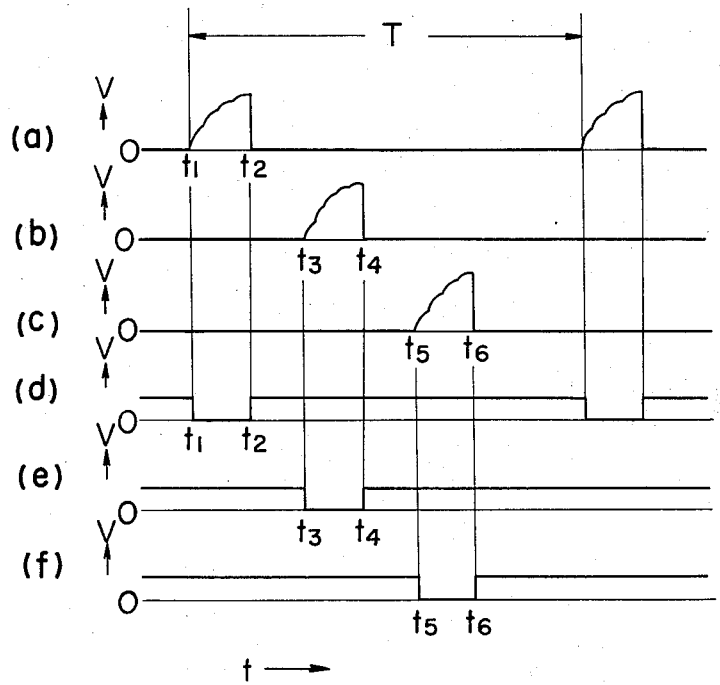
FIG. 3 is waveforms necessary for the explanation of the ignition device shown in FIG. 1.

At time $t_3$, the interrupter 22 is closed so that the controlled rectifier 16 is cut off, as is apparent from FIG. 3. Since, at this time, the interrupters 21 and 23 are opened, the controlled rectifiers 15 and 17 are conductive. Therefore, the capacitors 9 and 10 are charged through paths: DC–AC converter 3 - diode 4 - resistor 6 - terminal B - capacitors 9 and 10 - terminals A and C - primary windings 12a and 14a of ignition coils 12 and 14 - controlled rectifiers 15 and 17 - the earth.

The charging process of the capacitors 9 and 10 are shown in FIG. 3(b).

When at time $t_4$ the interrupter 22 is opened, the controlled rectifier 16 turns conductive so that the discharge currents from the capacitors 9 and 10 flow through the primary winding 13a of the ignition coil 13 to cause the plug 28 to spark.

In like manner, when at time $t_5$ the interrupter 23 is closed, the capacitors 10 and 11 are charged in such a process as shown in FIG. 3(c), and when the interrupter 23 is opened at later time $t_6$ current flows through the primary winding 14a of the ignition coil 14 due to the discharge of the capacitors 10 and 11 to cause the ignition plug 29 to spark.

Thereafter the above described operations are serially repeated and the plugs 27, 28 and 29 are cyclically made to spark.

Figure 4:
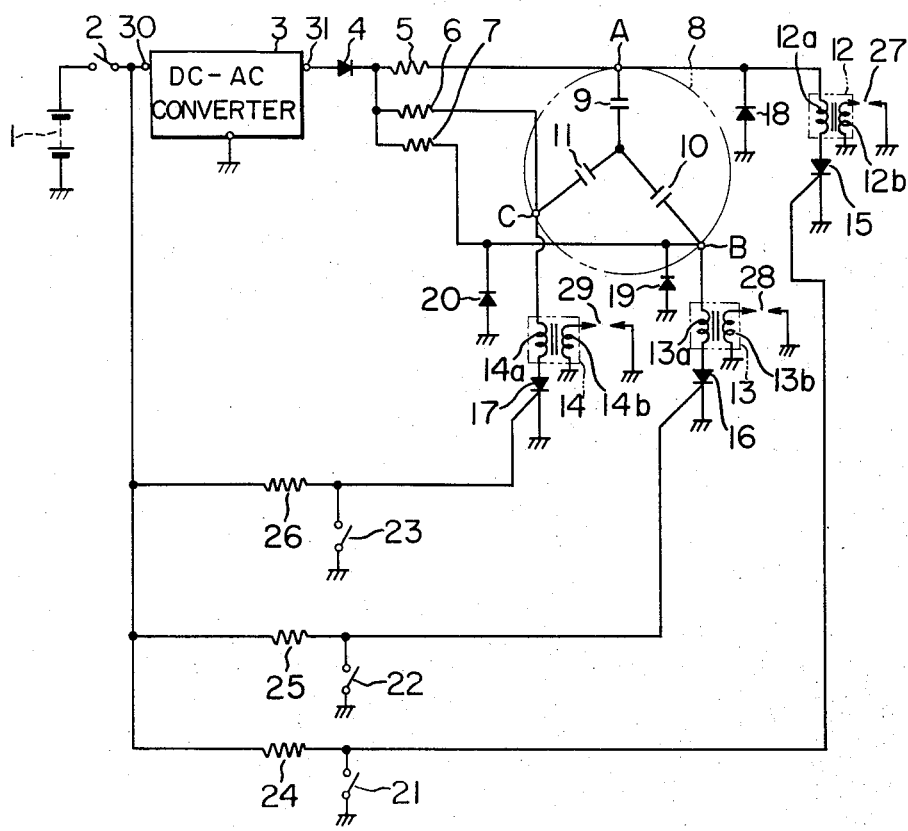
FIG. 4 is an electric circuit diagram of an ignition device as a second embodiment of the present invention.

FIG. 4 shows an ignition device as the second embodiment of the present invention, wherein the only difference from the first embodiment described above is that the capacitors 9, 10 and 11 shown in FIG. 1 are connected in Y-configuration. And the voltage waveforms appearing at the corresponding points are the same as those shown in FIGS. 3(a) to 3(f). This circuit in FIG. 4 has the same function as that shown in FIG. 1. In this case, however, all the capacitors 9, 10 and 11 must be operated each time any one of the plugs 27, 28 and 29 sparks, and for this reason the capacitances of the capacitors 9, 10 and 11 in this case are to be somewhat different than in the first embodiment. For example, when at time $t_1$ the interrupter 21 is opened, the capacitors 9 and 10 are paralelly charged in the first embodiment, thus these capacitors operating additively so that their combined capacitance is, let the capacitance of each capacitor be G, 2G, while the capacitors 9 and 10 in the second embodiment, are connected in series so that their total capacitance is reduced to ⅔G. Moreover, if the voltages applied to the capacitors 9, 10 and 11 in the first embodiment are H, then in the second embodiment the capacitor 9 has only to withstand a voltage of ⅔H and the capacitors 10 and 11 a voltage of ⅓H. Therefore, in order for the circuit of the second embodiment to provide the same ignition ability as is provided by the first embodiment, each of the capacitors of the group 8 in the second embodiment may have the capacitance value of each of those in the first embodiment multiplied by one and a half, while a withstand voltage value of each of those in the first embodiment multiplied by two thirds.

Figure 5:
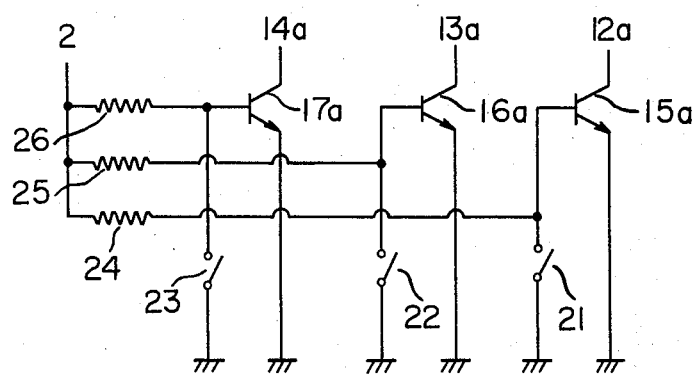
FIG. 5 is a circuit diagram of a switching means consisting of transistors, which is a modification of a switching means used in the circuit of FIG. 1 or FIG. 4.

The semiconductor switching elements in the circuit shown in FIG. 1 or FIG. 2 can be substituted by transistors 15a, 16a and 17a as in the circuit shown in FIG. 5.

Figure 6:
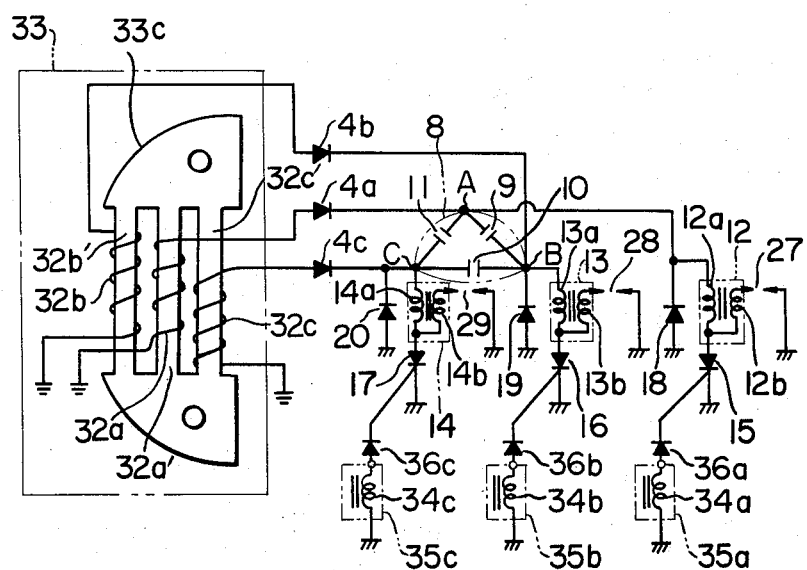
FIG. 6 is an electric circuit diagarm of an ignition device as a third embodiment of the present invention.

In the third embodiment of the present invention shown FIG. 6, in contrast to the first embodiment, a magneto generator 33 including three coils 32a, 32b and 32c for charging capacitors and three associate diodes for rectification are provided as a DC power source for capacitor charging, and ignition signal generators 35a, 35b and 35c having ignition signal generating coils 34a, 34b and 34c are provided as means for supplying ignition signals for the controlled rectifiers 15, 16 and 17. The coil 32a for capacitor charging is grounded at its one end and connected at the other end through the rectifying diode 4a with the terminal A of the capacitor group 8, the coil 32b has its one end grounded and the other end connected through the diode 4b with the terminal B, and the coil 32c is connected between the earth and the anode of the diode 4c of which the cathode is connected with the terminal C. The ignition signal generating coils 34a, 34b and 34c have their ends grounded on one side and connected on the other side with the gates of the controlled rectifiers 15, 16 and 17 through the diodes 36a 36b and 36c.

Figure 7:
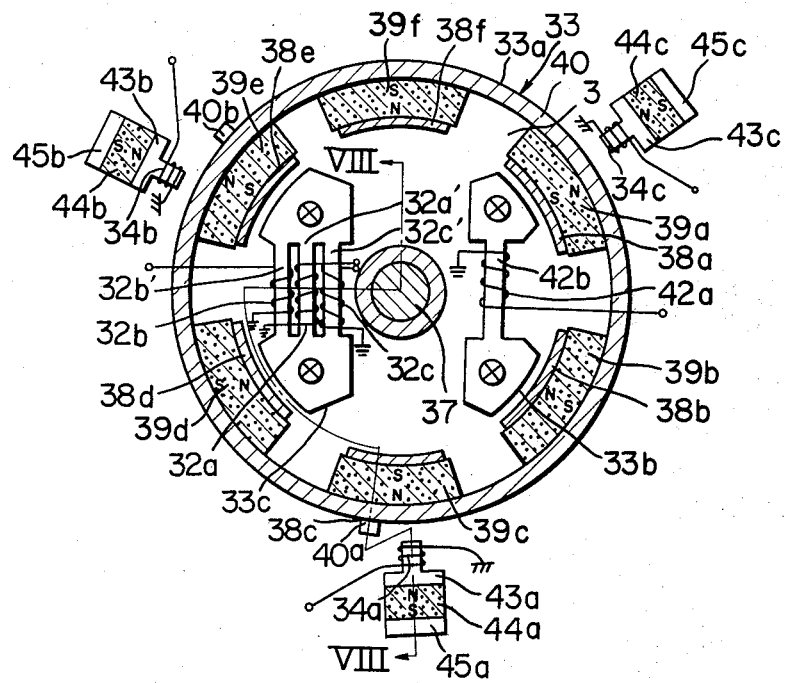
FIG. 7 is a cross section of a magneto generator together with ignition signal supplying means shown in FIG. 6.
Figure 8:
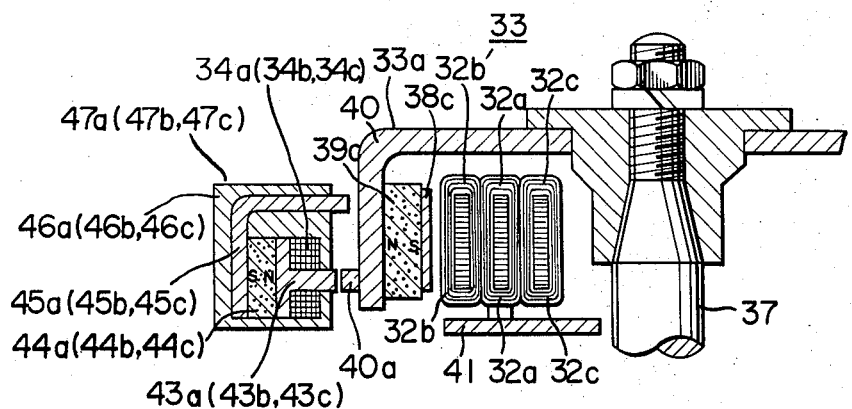
FIG. 8 is a cross section taken along line 8 — 8 in FIG. 7.

The mechanical constitutions of the magneto generator 33 and the ignition signal generators 35a, 35b and 35c will now be descirbed by reference to FIGS. 7 and 8. In FIG. 7, the rotor 33a of the magneto generator 33 is driven by the crank shaft 37 of the internal combustion engine and has a cup-like member 40 if iron on the inner wall of which six magnets 39a, 39b, 39c, 39d, 39e and 39f carrying thereon respectively magnetic pole pieces 38a, 38b, 38c, 38d, 38e and 38f are circumferentially equidistantly disposed in such a manner that the circumferentially disposed pole pieces may exhibit N and S poles alternately. And on the outer periphery of the cup-like member 40 are provided protrusions 40a and 40b of magnetic material. Stators 33b and 33c are disposed fixedly on a supporting plate 41 in a predetermined relation to the pole pieces 38a to 38f of the rotor 33a, as seen in FIG. 7. The stator 33b consists of an iron core 42b and a coil 42a and is here provided for electric loads other than lamps, battery charging device etc. which are not shown in FIG. 6. The stator 33c has iron cores 32a', 32b' and 33c' parallel arranged and magnetically coupled and coils 32a, 32b and 32c for charging capacitors wound on the iron cores 32a', 32b' and 32c'. As seen from the FIG. 7 wherein the geometry of the iron cores of the stator 33c is shown, the coils 32a, 32b and 32c are commonly associated with a pair of magnetic poles. The ignition signal generating coils 34a, 34b and 34c are wound about timing core 43a, 43b and 43c which are coupled to magnets 44a, 44b and 44c which are in turn coupled to magnetic cores 45a, 45b and 45c.

The structures 47a, 47b and 47c having enclosures 46a, 46b and 46c of non-magnetic material such as synthetic resin and comprising the above mentioned members, are fixed rigidly to a supporting member (not shown) disposed near the magneto generator 33 in such a manner that the timing cores 43a, 43b and 43c may pass near the protrusions 40a and 40b when the rotor 33a is rotated and that the extended ends of the cores 45a, 45b and 45c may be disposed near the outer periphery of the rotor 33a. Hence, when the timing cores 43a, 43b and 43c approaches the protrusions 40a and 40b the quantity of magnetic flux through magnets (44a, 44b, 44c), timing cores (43a, 43b, 43c), protrusions (40a, 40b), body of cup-like member 40, cores (45a, 45b, 45c) and magnets (44a, 44b, 44c) varies so that ignition signal voltages are induced in the ignition signal generating coils 34a, 34b and 34c.

Figure 9:
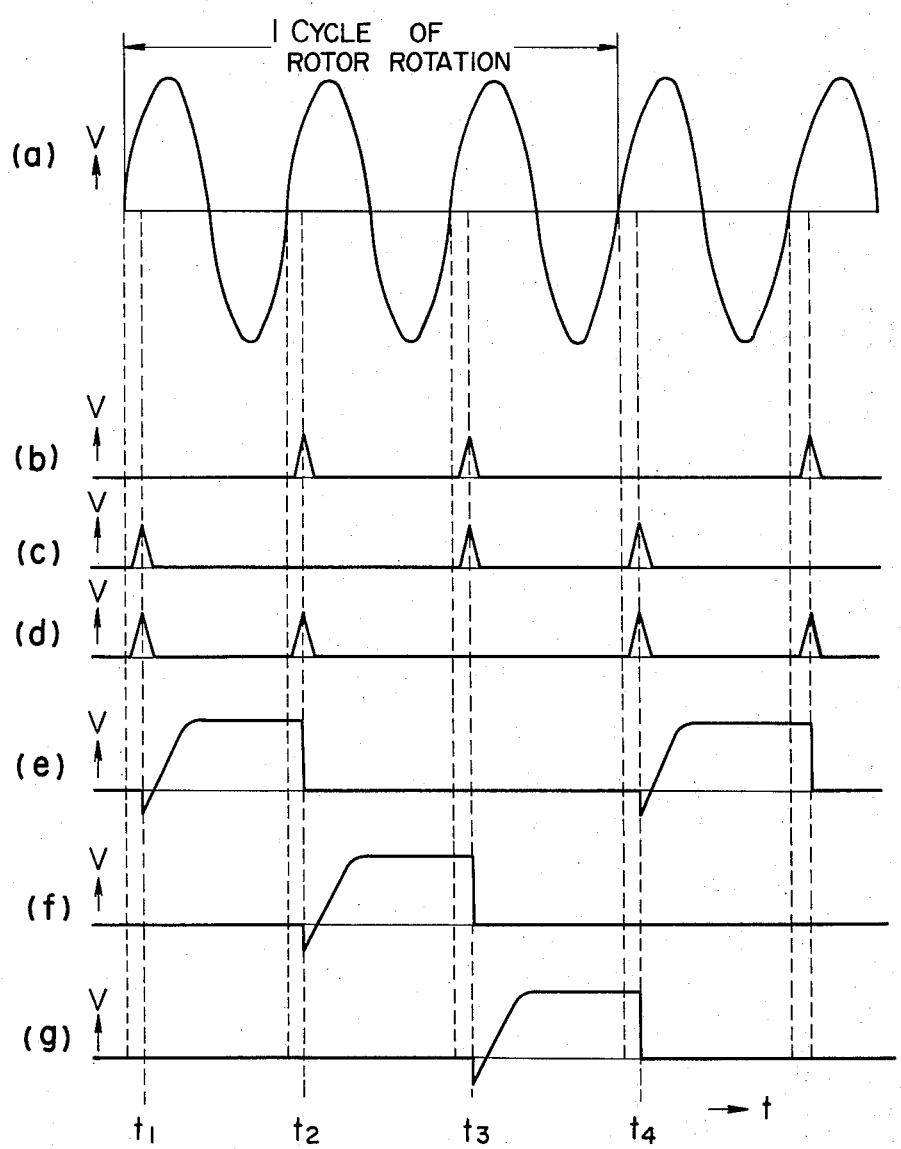
FIG. 9 is a waveforms necessary for the explanation of the device shown in FIG. 6.

Next, the description of the operation of the third embodiment shown in FIG. 6 will be given. FIG. 9(a) shows no-load voltage induced in the coils 32a, 32b and 32c. The relative positions of the waveforms of the voltage applied to the gate of the controlled rectifier 15 from the ignition signal generating coil 34a, the voltage applied to the gate of the controlled rectifier 16 from the ignition signal generating coil 34b and the voltage applied to the gate of the controlled rectifier 17 from the ignition signal generating coil 34c, are set as shown respectively in FIGS. 9(b), 9(c) and 9(d). At time $t_1$ when the voltage induced in the coil 32a is positively increasing, the gates of the controlled rectifiers 16 and 17 simultaneously receive signals from the coils 34b and 34c. Accordingly, the controlled rectifiers 16 and 17 turn conductive so that the capacitor charging coils 32b and 32c are short-circuited through the primary windings 13a and 14a of the ignition coils 13 and 14. Consequently, short-circuit current flow through the coils 32b and 32c and the reverse flux is established through the cores 32b' and 32c' of the coils 32b and 32c, so that the flux from the magnetic poles pass almost entirely through the iron core 32a' associated with the coil 32a which has now a small magnetic reluctance. And the capacitors 9 and 11 are charged by the voltage induced in the coil 32a due to the total flux entering the stator 33c, through paths: diode 4a - terminal A - capacitor 9 - terminal B - primary winding 13a of ignition coil 13 - controlled rectifier 16 - the earth, and diode 4a - terminal A - capacitor 11 - terminal C - primary winding of ignition coil 14 - controlled rectifier 17 - the earth. The process of the charging of the capacitors is shown in FIG. 9(e) wherein the waveform shown appears at terminal A in FIG. 6. When the charging of the capacitors 9 and 11 are completed and the polarity of the voltage induced in the coil 32a is inverted, the controlled rectifiers 16 and 17 turns off. At time $t_2$ when the voltage induced in the coil 32b is positively increased, ignition signals are applied to the gates of the controlled rectifiers 15 and 17 from the ignition signal generating coils 34a and 34c so that the controlled rectifiers 15 and 17 turn conductive to release the electric charges stored in the capacitors 9 and 11 through the paths: primary winding 12a of ignition coil 12 - controlled rectifier 15 - diode 19 - capacitor 9, and primary winding 12a of ignition coil 12 - controlled rectifier 15 - diode 20 - capacitor 11. Consequently, an ignition voltage is induced in the secondary winding 12b of the coil 12 and the coils 32a and 32c are short-circuited, so that a voltage is induced in the coil 32b, which voltage charges the capacitors 9 and 10 through the paths: diode 4b - terminal B - capacitor 9 - terminal A - primary winding 12a of ignition coil 12 - controlled rectifier 15 - the earth, and diode 4b - terminal B - capacitor 10 - terminal C - primary winding 14a of ignition coil 14 - controlled rectifier 17 - the earth. In this process of charging the terminal B is kept positive (the state being shown in FIG. 9(f)). In response to the next ignition signals (signals at time $t_3$ in FIGS. 9(b) and 9(c)), capacitors 9 and 10 discharge so that an ignition voltage is induced in the secondary winding 13b of the ignition coil 13. At the same time, the capacitors 10 and 11 are charged from the coil 32c (see FIG. 9(g)) and then discharge in response to the next ignition signals (signals at time $t_4$ in FIGS. 9(c) and 9(d)) so that an ignition voltage is induced in the secondary winding 14b of the coil 14. Thus, ignition voltages are induced in the three ignition coils 12, 13 and 14 and the plugs 27, 28 and 29 are caused to sucessively spark. In the first and third embodiment as described above, the currents flowing from the coils 32a, 32b and 32c into the primary winding 12a, 13a and 14a of the ignition coils 12, 13 and 14 are as small as one hundredth of the current due to the discharge of the capacitors and there is no possibility of the plugs sparking due to the currents from the coils 32a, 32b and 32c. Moreover, since when the electric charges stored, for example, in the capacitors 9 and 11 are released due to the conduction of the controlled rectifier, the reverse voltages equal in magnitude to the voltage drops across the diodes 19 and 20 are applied to the controlled rectifiers 16 and 17 and the ignition coils 13 and 14, there is no possibility of the erroneous operation of the controlled rectifiers 16 and 17. Hence, a stable ignition operation can be obtained. Further, two of the discharge capacitors 9, 10 and 11 operate at a time so that a prolonged spark time can be obtained. And this improves the operation of the engine.

Figure 10:
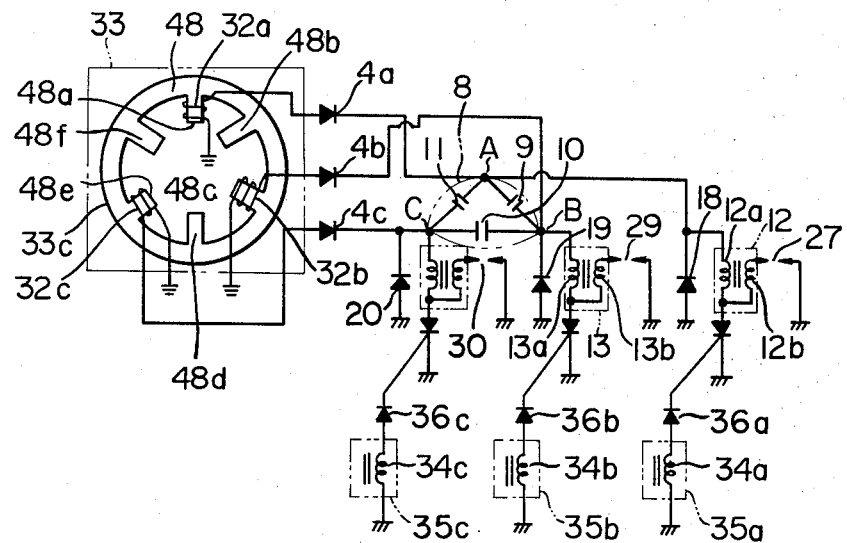
FIG. 10 is an electric circuit diagram of an ignition device as a fourth embodiment of the present invention.
Figure 11:
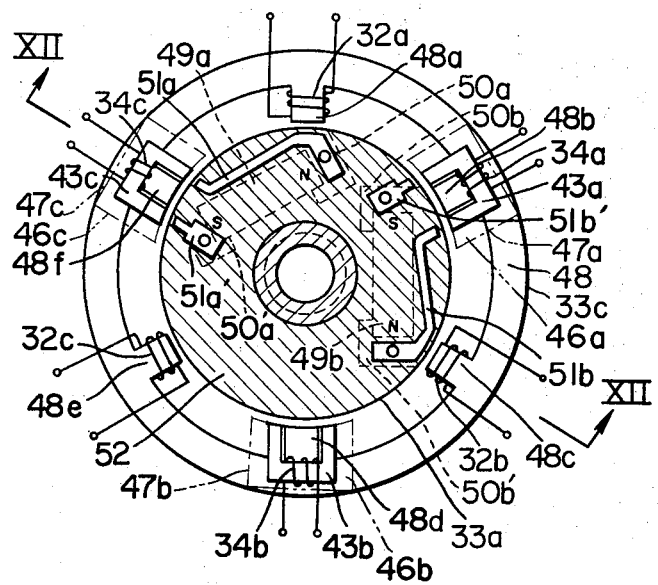
FIG. 11 is a cross section of a magneto generator together with an ignition signal supplying means shown in FIG. 10.
Figure 12:
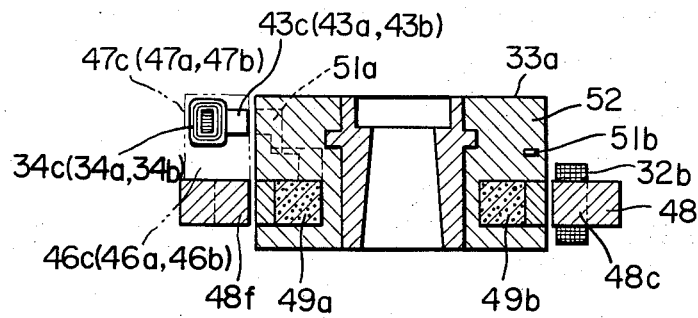
FIG. 12 is a cross section taken along line 12 — 12 in FIG. 11.

FIGS. 10, 11 and 12 show a fourth embodiment of the invention wherein the structures of the magneto generator 33 and the ignition signal generators 35a, 35b, 35c are different from those used in the foregoing embodiments. Namely, as seen in FIG. 10, in the fourth embodiment, the stator 48 has six salient poles 48a to 48f and three coils 32a, 32b and 32c for charging capacitors are wound about every other pole, for example, 48a, 48c and 48e, respectively. The rotor 33a is rotated in the stator 48. The rotor 33a, as seen in FIG. 11, is a combined body cast with a non-magnetic material such as aluminum alloy which body comprises two magnets 49a and 49b magnetized in the circumferential direction of the rotor 33a, magnetic pole pieces 50a, 50a', and 50b and 50b' attached respectively to the north and south poles of the two magnets and auxiliary cores 51a, 51a', 51b and 51b' fixed rigidly to the magnetic pole pieces.

The structures 47a, 47b and 47c of the ignition signal generator 35a, 35b and 35c comprise respectively timing cores 43a, 43b and 43c in the shape of a flat-bottomed U, ignition signal generating coils 34a, 34b and 34c wound about the timing cores, and members 46a, 46b and 46c of non-magnetic material enclosing the aforementioned parts. The structures 47a, 47b and 47c are so arranged at the salient poles 48b, 48d and 48f of the stator 48 that both ends of each timing core may be opposed to a pair of auxiliary cores 51a and 51a' or 51b and 51b' of the rotor 33a.

In this fourth embodiment, the magnets 49a and 49b of the rotor 33a can also be used as those of the ignition signal generators 35a, 35b and 35c.

Figure 13:
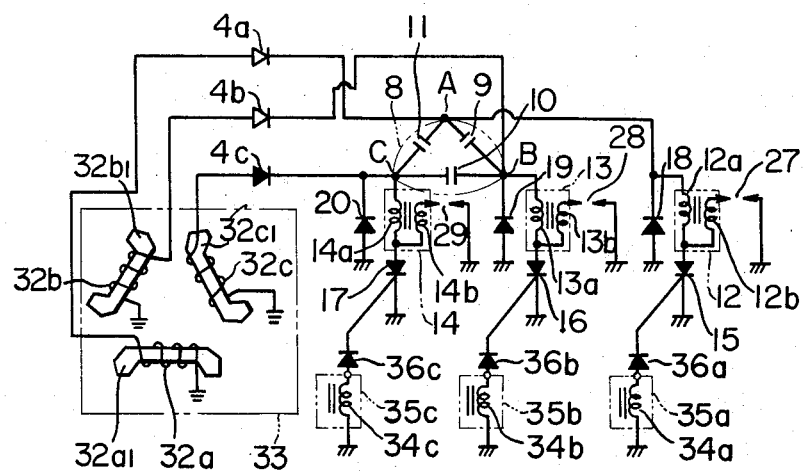
FIG. 13 is an electric circuit diagram of an ignition device as a fifth embodiment of the present invention.
Figure 14:
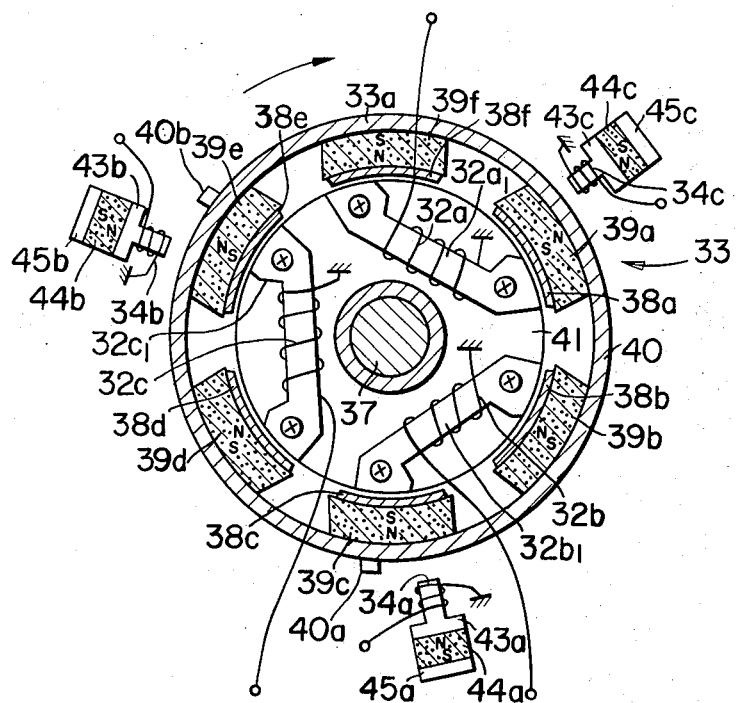
FIG. 14 is a cross section of a magneto generator together with an ignition signal supplying means shown in FIG. 13.

In a fifth embodiment of the present invention shown in FIGS. 13 and 14, as compared with the fourth, the rotor 33a is of outer-field type as in the third embodiment and the coils 32a, 32b and 32c for charging capacitors are wound independently about separate iron cores $32a_1$, $32b_1$ and $32c_1$, the iron cores being disposed on a support plate 41 separated from one another by a spatial angle of 120°. Further, the fifth embodiment is provided with the same ignition signal generators 35a, 35b, 35c as those used in the third embodiment.

Figure 15:
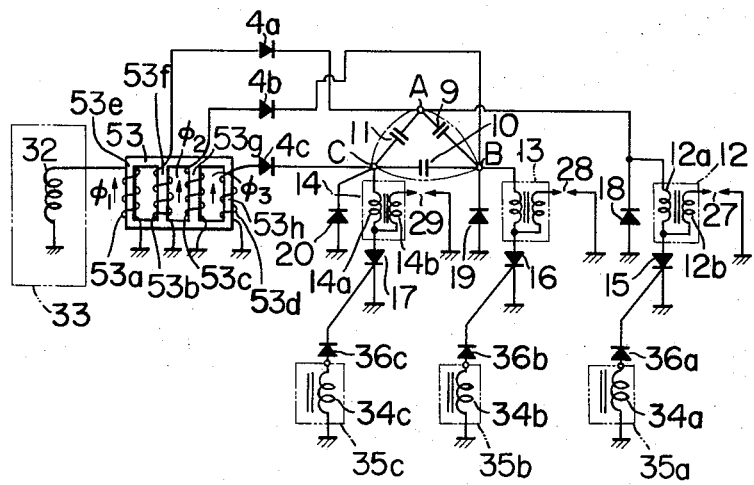
FIG. 15 is an electric circuit diagram of an ignition device as a sixth embodiment of the present invention.
Figure 16:
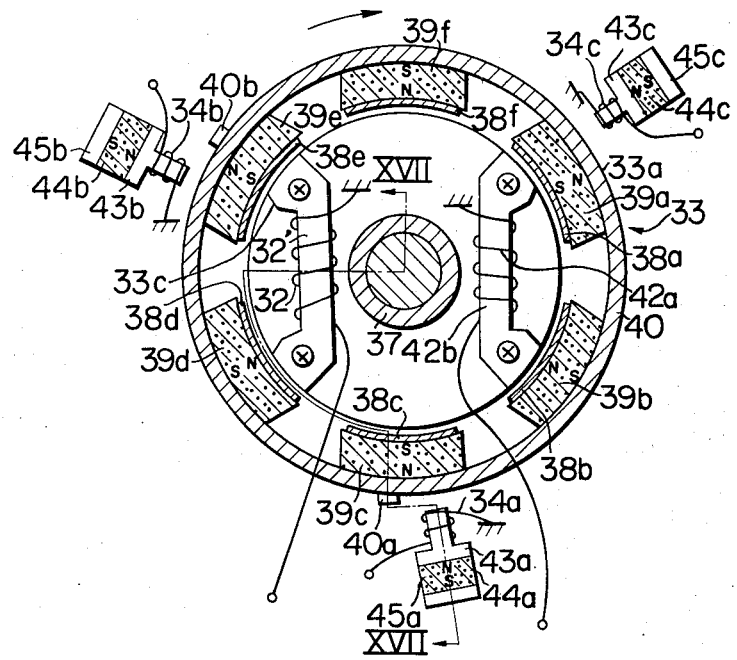
FIG. 16 is a cross section of a magneto generator together with an ignition signal supplying means shown in FIG. 15.
Figure 17:
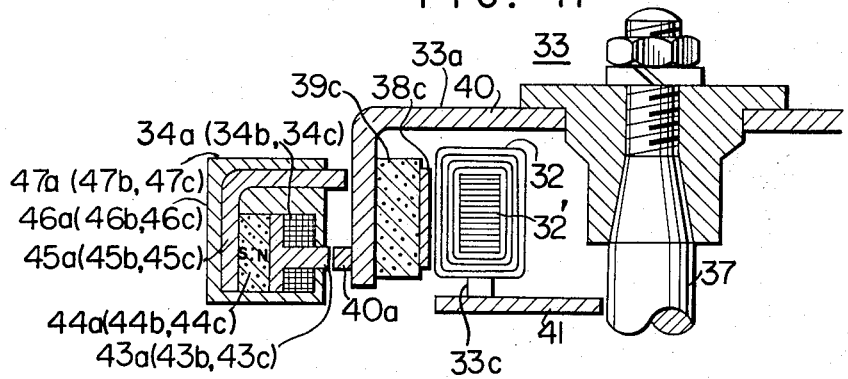
FIG. 17 is a cross section taken along line 17 — 17 in FIG. 16.

A sixth embodiment of the invention shown in FIG. 15, as compared with the third, is provided with a magneto generator 33 incorporating a coil for charging capacitors serving as a capacitor charging DC power source, a transformer 53, and rectifying diodes 4a, 4b and 4c. The magneto generator 33 has a structure as shown in FIGS. 16 and 17. As seen from the figures, the stator 33c comprises a coil 32 for charging capacitors and an iron core 32' about which the coil 32 is to be wound. The transformer 53 has four core legs 53e, 53f, t3g and 53h, a primary winding 53a wound about the leg 53e, and three secondary windings 53b, 53c and 53d wound respectively about the legs 53f, 53g and 53h, the four core legs constituting closed magnetic circuits. The primary winding 53a is connected between the earth and the coil 32. The secondary winding 53b is connected between the earth and the rectifying diode 4a, the secondary winding 53c between the earth and the diode 4b, and the secondary winding 53d between the earth and the diode 4c. Accordingly, the energy of the capacitor charging coil 32 is transferred to the primary winding 53a of the transformer 53 and the secondary windings 53b, 53c and 53d of the transformer 53 play the parts of the capacitor charging coils 32a, 32b and 32c in the third embodiment as described above.

The coil 32 of this sixth embodiment does not directly charge the capacitor group 8 but transfers the magnetic evergy of the magneto generator to the transformer 53. Therefore, there is no need for a high output voltage from the magneto generator, and there is no need for five wires being wound in the magneto generator, five wires being wound only about the legs of the transformer 53. The technique of winding five wires about formers is now fully developed in the field of the art concerned so that the constitution of the sixth embodiment will add to the stability of ignition characteristic.

Figure 18:
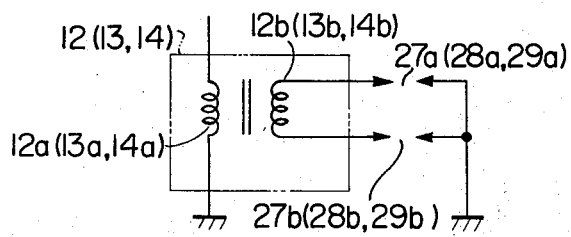
FIG. 18 shows in electric circuit another way of connecting ignition plugs with ignition coil, which is applicable to the embodiment mentioned above.

The first to sixth ignition devices embodying the present invention, if spark plugs 27a, 27b, 28a, 28b, 29a and 29b are connected with the secondary windings 12b, 13b and 14b of the ignition coils 12, 13 and 14 as seen in FIG. 18, can be used in an engine having six cylinders. Moreover, if in the embodiments except the second one the structure of the capacitor group 8 is changed from its delta-connection to a polygonal connection comprising a plurality of capacitors connected with one another and if in the second embodiment the Y-connected structure is changed into a radial connection comprising a plurality of capacitors having their one ends connected together, with all the associated elements added, the modified device can be applied to a muliple cylinder engine.

Further, in the embodiments above described, the capacitors of the capacitor group 8 are charged by cutting off one of the plural switching means and by rendering the other switching means conductive and the charges stored in the capacitors are released through the one of the switching means by rendering it conductive. However, the capacitors of the capacitor group 8 can also be charged by rendering at least one of the plural switching means conductive and by cutting off at least one of the plural switching means and the charges stored in the capacitors can also be released through only one of the switching means maintained cut off by turning it conductive. This case will be described below with reference to FIG. 1 which shows the first embodiment of the present invention.

If in the circuit shown in FIG. 1 only the controlled rectifier 16 is rendered conductive, the capacitors 9 and 10 of the capacitor group 8 are charged through the DC–AC converter 3, the diode 4, the resistors 5 and 7. Next, if the charges stored in the capacitors 9 and 10 are discharged by turning on the controlled rectifier 15 through the primary winding 12a of the ignition coil 12, the controlled rectifier 15, the diode 19 for discharging, then a spark voltage is induced in the secondary winding 12b of the ignition coil 12. In a like manner, the capacitors 10 and 11 are charged by turning on the controlled rectifier 17 and then the charges stored in the capacitors 10 and 11 are discharged through the controlled rectifier 16, the primary winding 13a of the ignition coil 13, and the diode 20 for discharging by turning on the controlled rectifier 16. In a similar way, capacitors 9 and 11 are charged when the controlled rectifier 15 is turned on and the charges stored in the capacitors 9 and 11 are discharged by rendering the controlled rectifier 17 through the rectifier 17, the primary winding 14a of the ignition coil 14, and the diode 18 for discharging. Thus, the cycle will be repeated.

We claim:

1. An ignition device for use in a multiple cylinder internal combustion engine comprising:

a DC power source for charging capacitors;

a group of capacitors having a predetermined plurality of terminals connected with one electrode of said DC power source, at least one of said capacitors being connected between adjacent two of said predetermined plurality of terminals;

a plurality of series circuits, one for each of said predetermined plurality of terminals, a plurality of ignition coils, one for each of said plurality of series circuits, and each having primary and secondary windings, each of said series circuits including a primary winding of a corresponding one of said coils and a switching means, controlling means for periodically controlling each of said switching means in synchronism with ignition timing of said engine;

a plurality of discharging diodes, one for each of said plurality of series circuits, said plurality of discharging diodes being respectively connected in parallel with said plurality of series circuits, respectively; each of said plurality of terminals being connected with the other electrode of said DC power source through each of said series circuits and each of said discharging diodes connected in parallel therewith, and at least one spark plug being connected with the secondary winding of each of said ignition coils, wherein said capacitors of said capacitor group are charged by said DC power source by turning on at least one of said switching means and by turning off at least one of said switching means and thereafter the charges stored in said capacitors are discharged, by turning on at least one of said turned-off switching means, through one of said series circuits containing said turned-on switching means therein and through at least one of said discharging diodes other than the one connected in parallel with said turned-on switching means.

2. An ignition device for use in a multiple cylinder internal combustion engine comprising:
a DC power source for charging capacitors;
a group of capacitors having a predetermined plurality of terminals connected with one electrode of said DC power source, at least one of said capacitors being connected between adjacent two of said predetermined plurality of terminals;
a plurality of series circuits, one for each of said predetermined plurality of terminals, a plurality of ignition coils, one for each of said plurality of series circuits, and each having primary and secondary windings, each of said series circuits including a primary winding of a corresponding one of said coils and a switching means, controlling means for periodically controlling each of said switching means in synchronism with ignition timing of said engine;
a plurality of discharging diodes, one for each of said plurality of series circuits, said plurality of discharging diodes being respectively connected in parallel with said plurality of series circuits, respectively; each of said plurality of terminals being connected with the other electrode of said DC power source through each of said series circuits and each of said discharging diodes connected in parallel therewith, and at least one spark plug being connected with the secondary winding of each of said ignition coils, wherein said capacitors of said capacitor group are charged by said DC power source by turning off one of said switching means and by turning on the remainder of said switching means and thereafter the charges stored in said capacitors are discharged, by turning on said one turned-off switching means through one of said series circuits containing said turned-on switching means therein and through at least one of said discharging diodes other than the one connected in parallel with said turned-on switching means.

3. An ignition device according to claim 1, wherein said DC power source comprises a magneto generator having a plurality of capacitor charging coils whose number is equal to that of said terminals of said capacitor group and a plurality of rectifying diodes connected between said terminals and said capacitor changing coils.

4. An ignition device according to claim 1, wherein aid DC power source comprises a magneto generator having a capacitor charging coil, a transformer electrically coupled to said capacitor charging coil and rectifying diodes electrically coupled to said transformer; said transformer comprising a primary winding connected with said capacitor charging coil, secondary windings magnetically coupled to said primary winding the whose number is equal to that of said terminals of said capacitor group, and magnetic cores associated respectively with said primary and secondary windings; said magnetic cores forming closed magnetic circuits; and said rectifying diodes being connected between said secondary windings and said terminals of said capacitor group.

5. An ignition device according to claim 2, wherein said DC power source comprises a magneto generator having a plurality of capacitor charging coils whose number is equal to that of said terminals of said capacitor group and a plurality of rectifying diodes connected between said capacitor changing coils.

6. An ignition device according to claim 2, wherein said DC power source comprises a magneto generator having a capacitor charging coil, a transformer electrically coupled to said capacitor charging coil and rectifying diodes electrically coupled to said transformer; said transformer comprising a primary winding connected with said capacitor charging coil, secondary windings magnetically coupled to said primary winding whose number is equal to that of said terminals of said capacitor group, and magnetic cores associated respectively with said primary and secondary windings; said magnetic cores forming closed magnetic circuits; and said rectifying diodes being connected between said secondary windings and said terminals of said capacitor group.

7. An ignition device according to claim 1, wherein said capacitor group includes a plurality of capacitors connected in ring-shaped arrangement and the junctions of the adjacent capacitors of said capacitor group serve as said terminals of said capacitor group.

8. An ignition device according to claim 1, wherein said capacitor group includes a plurality of capacitors arranged in a radial configuration with their one ends connected in common and their other ends serving as said terminals of said capacitor group.

9. An ignition device according to claim 2, wherein said capacitor group includes a plurality of capacitors connected in ring-shaped arrangement and the junctions of the adjacent capacitors of said capacitor group serve as said terminals of said capacitor group.

10. An ignition device according to claim 2, wherein said capacitor group includes a plurality of capacitors arranged in a radial configuration with their one ends connected in common and their other ends serving as said terminals of said capacitor group.

11. An ignition device according to claim 7, wherein said capacitor group includes three delta-connected capacitors providing three terminals.

12. An ignition device according to claim 8, wherein said capacitor group includes three delta-connected capacitors providing three terminals.

13. An ignition device according to claim 7, wherein said capacitor group includes three Y-connected capacitors and the radial end terminals of said capacitors serve as three terminals.

14. An ignition device according to claim 8, wherein said capacitor group includes three Y-connected capacitors and the radial end terminals of said capacitors serve as three terminals.

* * * * *